United States Patent
Okazaki et al.

(10) Patent No.: US 11,651,385 B2
(45) Date of Patent: May 16, 2023

(54) WALLET SERVER, COMPUTER-READABLE RECORDING MEDIUM, WALLET SYSTEM, AND REWARD PROVIDING METHOD

(71) Applicant: TOYOTA JIDOSHA KABUSHIKI KAISHA, Toyota (JP)

(72) Inventors: Kenji Okazaki, Toyota (JP); Masato Endo, Chofu (JP); Mayumi Kurita, Tokyo-to (JP); Masashi Toritani, Tokyo-to (JP); Kumiko Matsuura, Tokyo-to (JP); Takayuki Shikoda, Tokyo-to (JP); Masaaki Otsuka, Kawasaki (JP); Yoshikazu Ishii, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/177,718

(22) Filed: Feb. 17, 2021

(65) Prior Publication Data

US 2021/0334838 A1 Oct. 28, 2021

(30) Foreign Application Priority Data

Apr. 22, 2020 (JP) .............................. JP2020-076232

(51) Int. Cl.
*G06Q 30/00* (2023.01)
*G06Q 30/0207* (2023.01)
*G06Q 20/36* (2012.01)

(52) U.S. Cl.
CPC ......... *G06Q 30/0215* (2013.01); *G06Q 20/36* (2013.01)

(58) Field of Classification Search
CPC ........................... G06Q 30/0215; G06Q 20/36
See application file for complete search history.

(56) References Cited

U.S. PATENT DOCUMENTS

| | | | |
|---|---|---|---|
| 2012/0101884 A1* | 4/2012 | Duroux | G06Q 20/12 705/14.17 |
| 2015/0081529 A1* | 3/2015 | Lee | G06Q 20/227 705/39 |
| 2021/0049622 A1* | 2/2021 | He | G06N 3/088 |
| 2022/0164818 A1* | 5/2022 | Sato | G06Q 30/02 |

FOREIGN PATENT DOCUMENTS

| | | |
|---|---|---|
| JP | 2013-190861 A | 9/2013 |
| JP | 2021-015364 A | 2/2021 |

\* cited by examiner

*Primary Examiner* — Alvin L Brown
(74) *Attorney, Agent, or Firm* — Oliff PLC (57) ABSTRACT

A wallet server includes a processor including hardware. The processor is configured to acquire, from a plurality of terminals that are preset, evaluation information indicating an evaluation for a terminal other than an own terminal among the plurality of terminals, the evaluation information being generated by the own terminal, calculate reward amounts for the respective terminals based on the evaluation information, and deposit electronic money corresponding to the reward amounts to electronic wallets associated with the respective terminals.

15 Claims, 4 Drawing Sheets

```
YEAR: 2020, MONTH: XX

MEMBERS: Mr. A, Mr. B
DEPOSIT: 2,000 YEN (1,000 YEN EACH)

MR. A: ONE LIKE/REWARD: 500 YEN
MR. B: THREE LIKES/REWARD: 1,500 YEN

BALANCE OF DEPOSIT: ZERO YEN
```

FIG.4

```
YEAR: 2020, MONTH: XX

MEMBERS: Mr. A, Mr. B
DEPOSIT: 2,000 YEN (1,000 YEN EACH)
ONE LIKE: 300 YEN

MR. A: ONE LIKE/REWARD: 300 YEN
MR. B: THREE LIKES/REWARD: 900 YEN

BALANCE OF DEPOSIT: 800 YEN
```

FIG.5

WALLET SERVER, COMPUTER-READABLE RECORDING MEDIUM, WALLET SYSTEM, AND REWARD PROVIDING METHOD

CROSS-REFERENCE TO RELATED APPLICATION(S)

The present application claims priority to and incorporates by reference the entire contents of Japanese Patent Application No. 2020-076232 filed in Japan on Apr. 22, 2020.

BACKGROUND

1. Technical Field

The present disclosure relates to a wallet server, a computer-readable recording medium, a wallet system, and a reward providing method.

2. Related Art

Japanese Patent Application Laid-open No. 2013-190861 discloses a housekeeping service reservation method capable of leveling service supply.

It has been demanded a method that does not require direct exchange of money in a case where, for example, preset members such as acquaintances request each other for housework, work, etc.

It is desirable that a wallet server, a computer-readable recording medium, a wallet system, and a reward providing method that make it possible for preset members to request each other for housework, work, etc. without direct exchange of money or without hesitation are provided.

SUMMARY

In some embodiments, a wallet server includes a processor including hardware. The processor is configured to acquire, from a plurality of terminals that are preset, evaluation information indicating an evaluation for a terminal other than an own terminal among the plurality of terminals, the evaluation information being generated by the own terminal, calculate reward amounts for the respective terminals based on the evaluation information, and deposit electronic money corresponding to the reward amounts to electronic wallets associated with the respective terminals.

In some embodiments, provided is a non-transitory computer-readable recording medium with an executable program stored thereon. The program causes a processor comprising hardware to acquire, from a plurality of terminals that are preset, evaluation information indicating an evaluation for a terminal other than an own terminal among the plurality of terminals, the evaluation information being generated by the own terminal, calculate reward amounts for the respective terminals based on the evaluation information, and deposit electronic money corresponding to the reward amounts to electronic wallets associated with the respective terminals.

In some embodiments, a wallet system includes: a wallet server including a first processor comprising hardware; and a plurality of terminals each including a second processor including hardware. The second processor is configured to output, to the wallet server, evaluation information indicating an evaluation for a terminal other than an own terminal among the plurality of terminals, the evaluation information being generated by the own terminal, and the first processor is configured to calculate reward amounts for the respective terminals based on the evaluation information, and deposit electronic money corresponding to the reward amounts to electronic wallets associated with the respective terminals.

In some embodiments, provided is a reward providing method that causes a processor comprising hardware to acquire, from a plurality of terminals that are preset, evaluation information indicating an evaluation for a terminal other than the own terminal among the plurality of terminals, the evaluation information being generated by the own terminal, calculate reward amounts for the respective terminals based on the evaluation information, and deposit electronic money corresponding to the reward amounts to electronic wallets associated with the respective terminals.

The above and other objects, features, advantages and technical and industrial significance of this disclosure will be better understood by reading the following detailed description of presently preferred embodiments of the disclosure, when considered in connection with the accompanying drawings.

DETAILED DESCRIPTION

A wallet server, wallet program, a wallet system, and a reward providing method according to an embodiment of the present disclosure will be described with reference to the drawings. The components in the following embodiments include those that can be easily replaced by those skilled in the art, or those that are substantially the same.

Wallet System

Figure 1:
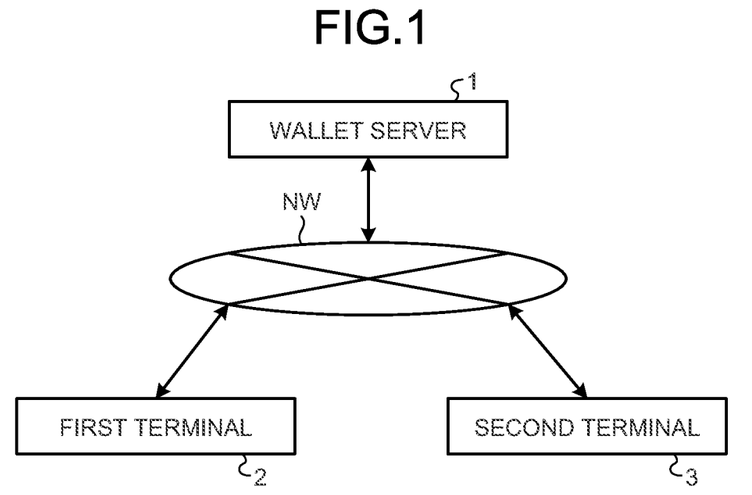
FIG. 1 is a diagram schematically illustrating a configuration of a wallet system according to an embodiment.

The configuration of a wallet system according to the embodiment will be described with reference to FIGS. 1 and 2. As illustrated in FIG. 1, the wallet system includes a wallet server 1, a first terminal 2, and a second terminal 3. In the wallet system, the wallet server 1, the first terminal 2, and the second terminal 3 are configured to be able to communicate with each other through a network NW. The network NW includes, for example, the Internet line network, a mobile phone line network, and the like. In the figure, only two terminals (the first terminal 2 and the second terminal 3) used by users are illustrated, but there may be three or more terminals. In the following description, when the first terminal 2 and the second terminal 3 are collectively referred to, they are referred to as "terminals".

Wallet Server

The wallet server 1 is a server that manages the wallet system according to the embodiment. This wallet server 1 is implemented by a general-purpose computer such as a workstation or a personal computer. The wallet server 1 is managed by a wallet system administrator (provider). As illustrated in FIG. 2, the wallet server 1 includes a control unit 11, a communication unit 12, and a storage 13.

Specifically, the control unit 11 includes a processor including a central processing unit (CPU), a digital signal processor (DSP), or a field-programmable gate array (FPGA), and a memory (main storage) including a random access memory (RAM), a read only memory (ROM), or the like. The control unit 11 loads a program stored in the storage 13 into the work area of the main storage and executes the program, and controls each of the components and the like through the execution of the program to implement functions that meet a predetermined purpose. Specifically, the control unit 11 functions as a rewarding unit 111 through the execution of the program.

The rewarding unit 111 is for providing a reward determined based on a predetermined standard for each terminal. This "providing a reward" means, for example, increasing the balance of an electronic wallet (hereinafter referred to as "wallet") associated with each terminal. The "wallet" indicates a virtual deposit/withdrawal account of electronic money.

The rewarding unit 111 acquires, from each terminal, evaluation information indicating the evaluation for a terminal other than an own terminal. The evaluation information is generated when each of users makes a touch operation on an evaluation button (for example, "like button") displayed on an operation/display unit 24 or 34 by an evaluation processing unit 214 or 314 of the corresponding terminal, and is input to the wallet server 1. Further, the "evaluation for a terminal" specifically means the evaluation for users who use the terminals.

The rewarding unit 111 then calculates the reward amount for each terminal based on the evaluation information acquired from the terminal, and deposits electronic money corresponding to the calculated reward amount into the wallet associated with each terminal. At that time, the rewarding unit 111 collects pieces of evaluation information from the terminals for a preset time period (for example, one month), and calculates the reward amount for each terminal for each time period.

Here, the rewarding unit 111 may deposit electronic money corresponding to the reward amount to the wallet of each terminal using, for example, electronic money deposited in advance from the balances of the wallets of the terminals (hereinafter referred to as "deposit"). In this case, the rewarding unit 111 acquires, from the terminals, information about the deposit that has been deposited from the balances of the wallets of the terminals.

The rewarding unit 111 then calculates the reward amount based on the evaluation information, and deposits the electronic money corresponding to the reward amount from the deposit to the wallet of each terminal. That is, the rewarding unit 111 updates wallet information 132 such that the wallet balance of each terminal is increased by the amount corresponding to the reward amount, and updates deposit information 134 such that the deposit amount is reduced by the total amount of the reward amounts for the terminals. By thus giving each user electronic money corresponding to a reward within the range of the deposit amount, it is possible to express gratitude for, for example, undertaking housework, work, etc. without direct exchange of money.

When depositing electronic money corresponding to a reward to the wallet of each terminal using the deposit, the calculation method of the reward amount for each terminal may be (1) a method of distributing the entire amount of the deposit or (2) a method of not distributing the entire amount of the deposit.

In the case of (1) above, the rewarding unit 111 calculates the reward amount for each terminal by allocating the deposit according to the ratio of the numbers of evaluations of the terminals included in the evaluation information. In a case where the reward amount is calculated by this calculation method, the rewarding unit 111 causes the operation/display units 24 and 34 to display, for example, a screen as illustrated in FIG. 3 through the first terminal 2 and the second terminal 3.

Figure 3:
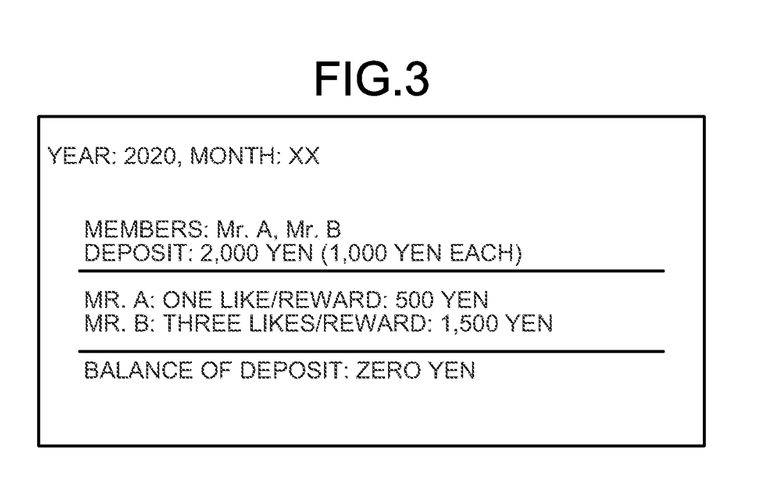
FIG. 3 is a diagram illustrating a first example of information about a deposit amount and a reward amount to be displayed on a terminal in the wallet system according to the embodiment.

In the example of FIG. 3, two users (Mr. A and Mr. B) have deposited 1,000 yen each, for a total of 2,000 yen. The evaluation of Mr. A is "one like (=one evaluation)", and the evaluation of Mr. B is "three likes (=three evaluations)". In such a case, as illustrated in the figure, the amounts obtained by division of the deposit amount in a ratio of 1:3 are reward amounts for the users. In this method, the entire deposit is distributed to the users, so the balance of the deposit becomes zero yen. By thus distributing the entire amount of the deposit to the users, it is possible to provide a more reward to a user who have contributed, for example, in housework, work, etc.

In the case of (2) above, the rewarding unit 111 calculates the reward amount by multiplying the number of evaluations of each terminal included in the evaluation information by the preset amount for one evaluation within the range of the deposit. When the reward amount is calculated by this calculation method, the rewarding unit 111 causes the operation/display units 24 and 34 to display a screen as illustrated in FIG. 4, for example, through the first terminal 2 and the second terminal 3.

Figure 4:
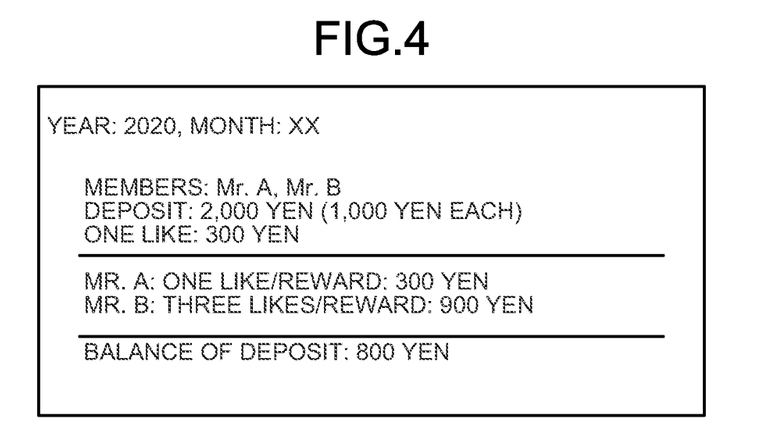
FIG. 4 is a diagram illustrating a second example of information about a deposit amount and a reward amount to be displayed on a terminal in the wallet system according to the embodiment.

In the example illustrated in FIG. 4, two users (Mr. A and Mr. B) have deposited 1,000 yen each, for a total of 2,000 yen. The amount for one like (=one evaluation) is 300 yen, the evaluation of Mr. A is "one like (=one evaluation)", and the evaluation of Mr. B is "three likes (=three evaluations)". In such a case, as illustrated in the figure, "1×300=300 yen" is the reward amount for Mr. A, and "3×300=900 yen" is the reward amount for Mr. B. In this method, the entire amount of the deposit is not distributed to the users, so the balance of the deposit is 800 yen. By thus giving rewards of amounts corresponding to the numbers of evaluations to the wallets of the terminals from the deposit, the balance of the deposit can be carried over to the next time.

Alternatively, the rewarding unit 111 may deposit electronic money corresponding to the reward amount to the wallet of each terminal without using the deposit. In this case, the rewarding unit 111 calculates the reward amount by multiplying the absolute value of the difference between evaluations of the terminals included in the evaluation information acquired from the terminals by the preset amount for one evaluation.

For example, a case where two users have deposited 1,000 yen each, for a total of 2,000 yen, the amount for one like (=one evaluation) is 300 yen, the evaluation of the first terminal 2 is one like (=one evaluation), and the evaluation of the second terminal 3 is three likes (=three evaluations) is considered. In this case, the rewarding unit 111 calculates the reward amount as "600 yen", which is obtained by multiplying an absolute value "2" of a difference between the evaluation of the first terminal 2 and the evaluation of the second terminal 3 by 300 yen.

The rewarding unit 111 then transfers electronic money corresponding to the reward amount (for example, 600 yen) from the wallet associated with the terminal having the smaller number of evaluations to a wallet associated with the terminal having the larger number of evaluations. In this way, the rewarding unit 111 deposits electronic money corresponding to the reward amount to the wallet of each terminal. That is, the rewarding unit 111 updates the wallet information 132 such that the balance of the wallet of the terminal having the smaller number of evaluations is reduced and the balance of the wallet of the terminal having the larger number of evaluations is increased by the amount corresponding to the reward amount. Thus, it is possible to provide a reward to each terminal without deposition in advance from each terminal.

In addition, when depositing electronic money corresponding to the reward amount to the wallet of each terminal without using the deposit, it is preferable that the rewarding unit 111 calculate the reward amount within a range of a preset amount (hereinafter referred to as "reward upper limit amount").

For example, a case where two users have deposited 1,000 yen each, for a total of 2,000 yen, the amount for one like (=one evaluation) is 300 yen, the reward upper limit amount is 500 yen, the evaluation of the first terminal 2 is one like (=one evaluation), and the evaluation of the second terminal 3 is three likes (=three evaluations) is considered. In this case, the rewarding unit 111 calculates the reward amount as "500 yen", which is included in the reward upper limit amount, out of "600 yen", which is obtained by multiplying the absolute value "2" of the difference between the evaluation of the first terminal 2 and the evaluation of the second terminal 3 by 300 yen. Thus, it is possible to prevent the reward amount from becoming high due to excessive sending of evaluations (=likes) between the terminals.

The communication unit 12 includes, for example, a Local Area Network (LAN) interface board, a wireless communication circuit for wireless communication, and the like. The communication unit 12 is connected to the network NW such as the Internet, which is a public communication network, or the like. The communication unit 12 communicates with the first terminal 2 and the second terminal 3 by connecting to the network NW.

The storage 13 includes a recording medium such as an Erasable Programmable ROM (EPROM), a Hard Disk Drive (HDD), and a removable medium. Examples of the removable medium include a disc recording medium such as a Universal Serial Bus (USB) memory, a Compact Disc (CD), a Digital Versatile Disc (DVD), and a Blu-ray (registered trademark) Disc (BD). The storage 13 can store an Operating System (OS), various programs, various tables, various databases, and the like. The storage 13 stores user information 131, the wallet information 132, settlement information 133, and the deposit information 134 for each user of the wallet system.

The user information 131 is information about a user who uses the wallet system. As the user information 131 includes, for example, the name and user contact information (for example, an address, a telephone number, an email address, etc.) of a user who has registered to use the wallet system in advance, a user ID and a password when the user uses the wallet system, and information about evaluations sent between the users. Note that, the user ID and the password are used, in particular, for authentication processing such as login to the wallet server 1.

The wallet information 132 is information about a wallet associated with each terminal in the wallet system. Examples of the wallet information 132 include a user ID, an electronic money balance, an electronic money charge history, an electronic money usage history, and the like.

The settlement information 133 is information about settlement of the wallet system. Examples of the settlement information 133 include a user ID, a settlement method used for settlement (for example, electronic money payment (contactless settlement), scan payment, code payment, etc.), a product purchase history, and the like. In addition, the "product purchase history" includes, for example, a store name, a store address, a purchased product name, a price of the purchased product, a purchase date and time, and the like.

The deposit information 134 is information about the deposit that is deposited in advance from the balances of the wallets associated with terminals. The deposit information 134 includes, for example, user IDs of users participating in the deposit, a deposit amount for each user, a total deposit amount, and the like.

First Terminal

The first terminal 2 is a mobile terminal owned by a first user. The "first user" in the present disclosure is a person who uses the wallet system and who, for example, requests a second user and is requested by the second user to do housework, work, etc., where the second user uses the second terminal 3. The first user can deposit electronic money (hereinafter referred to as "charge") and make a settlement using the electronic money through the first terminal 2. In addition, when the first user requests the second user to do housework, work, etc., the first user may send an evaluation (for example "like!") to the second terminal 3 through the first terminal 2. Examples of the first terminal 2 include a smartphone, a mobile phone, a tablet terminal, a wearable computer, or the like owned by the first user.

Figure 2:
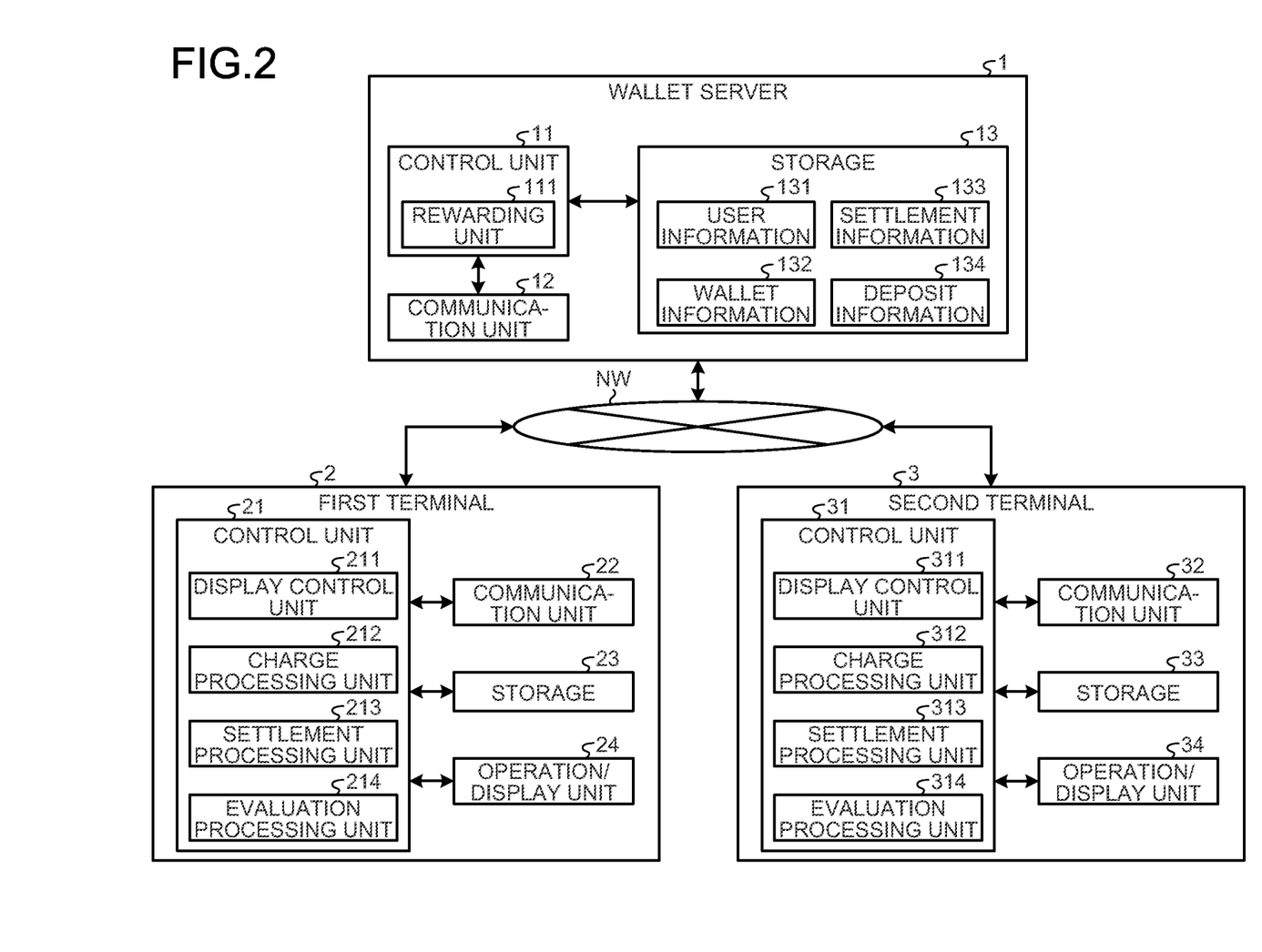
FIG. 2 is a block diagram illustrating details of each component of the wallet system according to the embodiment.

As illustrated in FIG. 2, the first terminal 2 includes a control unit 21, a communication unit 22, a storage 23, and the operation/display unit 24. The control unit 21, the communication unit 22, and the storage 23 are similar to the control unit 11, the communication unit 12, and the storage 13, respectively. The control unit 21 functions as a display control unit 211, a charge processing unit 212, a settlement processing unit 213, and an evaluation processing unit 214 through the execution of a program.

The display control unit 211 controls display contents on the operation/display unit 24. The display control unit 211 causes the operation/display unit 24 to display predetermined information based on an operation (touch operation, flick operation, etc.) of the first user. Examples of the information displayed on the operation/display unit 24 by the display control unit 211 include a member registration screen when the first user registers as a member of the wallet system, a login screen when the first user logs in to the wallet system, and a charge screen when the first user charges electronic money to the wallet, a list screen about the deposit amount and the reward amount of each user, and the like.

The charge processing unit 212 charges (deposits) electronic money to the wallet. Based on the operation of the first user, the charge processing unit 212 outputs a charge request for charging electronic money to the wallet to the wallet server 1 by a pre-registered (linked) charging method. Note that the "charging method" refers to a method of charging electronic money to a wallet, which is a virtual deposit/withdrawal account. Examples of the charging method include a bank account, a credit card, and the like. In addition, a plurality of charging methods can be registered as charging methods, and electronic money can be charged from any of the charging methods.

The control unit 11 of the wallet server 1 that has acquired the charge request from the charge processing unit 212 based on the operation of the first user increases the balance of the electronic money in the wallet of the first user based on the charge amount information included in the charge request. That is, the control unit 11 updates the wallet information 132 of the first user stored in the storage 13 according to the increased amount of the electronic money balance in the wallet of the first user. Then, the control unit 11 outputs the information indicating that the charge to the wallet is completed (hereinafter, referred to as "charge completion information") to the first terminal 2.

The settlement processing unit 213 outputs a settlement request for a settlement using, for example, electronic money charged in the wallet to a server provided in a store or the like (hereinafter, referred to as "store server"). The store server that has acquired the settlement request from the first terminal 2 outputs the settlement request including the settlement amount to the wallet server 1 via the network NW. The control unit 11 of the wallet server 1 that has acquired the settlement request from the store server reduces the balance of electronic money in the wallet of the first user based on the settlement amount included in the settlement request, and outputs the updated wallet information 132 and the settlement information 133 to the first terminal 2. In addition, the control unit 11 outputs information indicating that the settlement has been completed (hereinafter referred to as "settlement completion information") to the store server.

The evaluation processing unit 214 causes the operation/display unit 24 to display an evaluation button (for example, a "like button") for evaluating a user who owns another terminal (for example, the second terminal 3). Then, the evaluation processing unit 214 generates evaluation information when the first user touches the evaluation button, and outputs the generated evaluation information to the wallet server 1.

The storage 23 stores data of various screens displayed on the operation/display unit 24 by the display control unit 211 and the evaluation processing unit 214. Further, in the storage 23, the user information 131, the wallet information 132, the settlement information 133, the deposit information 134, and the like are stored as needed.

The operation/display unit 24 includes, for example, a touch panel display, and has an input function for accepting an operation by the first user's finger, a pen, or the like and a display function for displaying various types of information based on the control by the display control unit 211.

Second Terminal

The second terminal 3 is a mobile terminal owned by the second user. The "second user" in the present disclosure is a person who uses the wallet system and who, for example, requests the first user and is requested by the first user to do housework, work, etc., where the first user uses the first terminal 2. The second user can charge electronic money and make a settlement using the electronic money through the second terminal 3. In addition, when the second user requests the first user to do housework, work, etc., the second user may send an evaluation (for example "like!") to the first terminal 2 through the second terminal 3. Examples of the second terminal 3 include a smartphone, a mobile phone, a tablet terminal, a wearable computer, or the like owned by the second user.

As illustrated in FIG. 2, the second terminal 3 includes a control unit 31, a communication unit 32, a storage 33, and the operation/display unit 34. The control unit 31, the communication unit 32, the storage 33, and the operation/display unit 34 are similar to the control unit 21, the communication unit 22, the storage 23, and the operation/display unit 24. The control unit 31 functions as a display control unit 311, a charge processing unit 312, a settlement processing unit 313, and an evaluation processing unit 314 through the execution of a program. Since the functions of the display control unit 311, the charge processing unit 312, the settlement processing unit 313, and the evaluation processing unit 314 are similar to those of the display control unit 211, the charge processing unit 212, the settlement processing unit 213, and the evaluation processing unit 214, the description thereof is not provided.

Reward Providing Method

Figure 5:
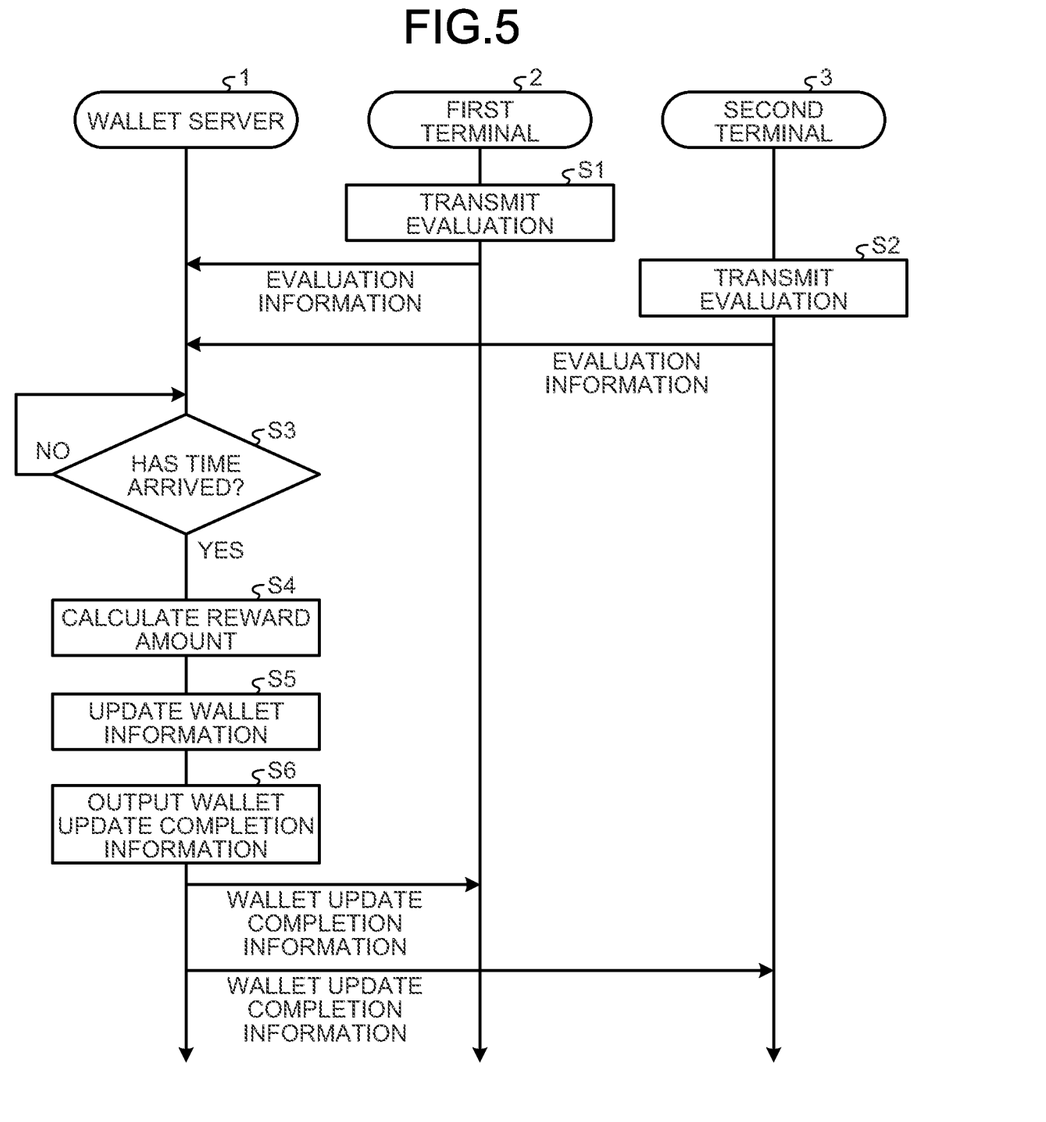
FIG. 5 is a flowchart illustrating an example of a reward providing method executed by the wallet system according to the embodiment.

Hereinafter, an example of the reward providing method executed by the wallet system according to the embodiment will be described with reference to FIG. 5. Here, a case where the first user and the second user request each other for housework, work, etc., and send evaluations to each other will be described.

First, the control unit 21 of the first terminal 2 transmits an evaluation of the second user to the wallet server 1 (step S1). In addition, the control unit 31 of the second terminal 3 transmits an evaluation of the first user to the wallet server 1 (step S2). The order of step S1 and step S2 may be reversed.

Subsequently, the rewarding unit 111 of the wallet server 1 determines whether or not a preset time has arrived (step S3). The "preset time" indicates, for example, a specific day (for example, the first day, the last day, etc.) of a month.

In a case where it is determined that the preset time has not arrived (No in step S3), the rewarding unit 111 returns to step S3. On the other hand, in a case where it is determined that the preset time has arrived (Yes in step S3), the rewarding unit 111 calculates the reward amount for each terminal based on the evaluation information transmitted from the terminals (step S4). The method of calculating the reward amount is not particularly limited. The reward amount may be calculated by, for example, allocating the deposit that is deposited in advance according to the ratio of the numbers of evaluations of the terminals, by multiplying the number of evaluations of each terminal by the preset amount for one evaluation within the range of the deposit, or by multiplying the absolute value of the difference between the evaluations of the terminals by the preset amount for one evaluation without using the deposit.

Next, the rewarding unit 111 increases or decreases the balances of electronic money in the wallets of the first terminal 2 and the second terminal 3 based on the reward amounts calculated in step S4, and updates the wallet information 132 according to the increased amount or the reduced amount (step S5). Next, the rewarding unit 111 outputs the wallet update completion information indicating that the wallet information 132 has been updated to the first terminal 2 and the second terminal 3 (step S6). Thus, the flow ends.

As described above, according to the wallet server, wallet program, wallet system, and reward providing method according to the embodiment, it is possible for preset members such as acquaintances to request each other for housework, work, etc. without direct exchange of money or without hesitation.

For example, in the embodiment, as an example of providing a reward to each terminal, a case where a financial reward (electronic money) is provided has been described, but instead of a financial reward, an electronic gift certificate, a discount ticket, a coupon, or the like may be provided as a reward.

According to the present disclosure, it is possible for preset members to request each other for housework, work, etc. without direct exchange of money or without hesitation.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A wallet server comprising a processor comprising hardware, the processor being configured to:
   acquire first evaluation information from a first user terminal associated with a first user, the first evaluation information evaluating a second user,
   acquire second evaluation information from a second user terminal associated with the second user, the second evaluation information evaluating the first user,
   calculate reward amounts for the first and second users based on the first evaluation information and the second evaluation information,
   deposit electronic money corresponding to the reward amounts to electronic wallets associated with the first and second user terminals,
   acquire, from the first and second user terminals, information about a shared deposit that has been deposited from balances of the electronic wallets of the first and second user terminals,
   transfer, from the shared deposit, electronic money corresponding to the reward amounts to the electronic wallets associated with the first and second user terminals, and
   calculate the reward amounts by allocating the shared deposit according to a ratio of the numbers of evaluations of each user included in the first and second evaluation information.

2. The wallet server according to claim 1, wherein the processor is configured to calculate the reward amounts, within a range of the shared deposit, by multiplying the numbers of evaluations of each user included in the first and second evaluation information by a preset amount for one evaluation.

3. The wallet server according to claim 1, wherein the processor is configured to:
   calculate the reward amounts by multiplying an absolute value of a difference between evaluations of the first and second user terminals included in the first and second evaluation information by a preset amount for one evaluation, and
   deposit electronic money corresponding to the reward amounts to the electronic wallets associated with the first and second user terminals by transferring electronic money corresponding to a reward amount to an electronic wallet associated with a terminal having the larger number of evaluations among the first and second user terminals from an electronic wallet associated with a terminal having the smaller number of evaluations among the first and second user terminals.

4. The wallet server according to claim 3, wherein the processor is configured to calculate the reward amounts within a preset amount range.

5. The wallet server according to claim 1, wherein the processor is configured to calculate the reward amounts for each preset time period.

6. A non-transitory computer-readable recording medium with an executable program stored thereon, the program causing a processor comprising hardware to:
   acquire first evaluation information from a first user terminal associated with a first user, the first evaluation information evaluating a second user,
   acquire second evaluation information from a second user terminal associated with the second user, the second evaluation information evaluating the first user,
   calculate reward amounts for the first and second users based on the first evaluation information and the second evaluation information,
   deposit electronic money corresponding to the reward amounts to electronic wallets associated with the first and second user terminals,
   acquire, from the first and second user terminals, information about a shared deposit that has been deposited from balances of the electronic wallets of the first and second user terminals,
   transfer, from the shared deposit, electronic money corresponding to the reward amounts to the electronic wallets associated with the first and second user terminals, and
   calculate the reward amounts by allocating the shared deposit according to a ratio of the numbers of evaluations of each user included in the first and second evaluation information.

7. The recording medium according to claim 6, wherein the program causes the processor to calculate the reward amounts, within a range of the shared deposit, by multiplying the numbers of evaluations of each user included in the first and second evaluation information by a preset amount for one evaluation.

8. The recording medium according to claim 6, wherein the program causes the processor to
   calculate the reward amounts by multiplying an absolute value of a difference between evaluations of the first and second user terminals included in the first and second evaluation information by a preset amount for one evaluation, and
   deposit electronic money corresponding to the reward amounts to the electronic wallets associated with the first and second user terminals by transferring electronic money corresponding to a reward amount to an electronic wallet associated with a terminal having the larger number of evaluations among the first and second user terminals from an electronic wallet associated with a terminal having the smaller number of evaluations among the first and second user terminals.

9. The recording medium according to claim 8, wherein the program causes the processor to calculate the reward amounts within a preset amount range.

10. The recording medium according to claim 6, wherein the program causes the processor to calculate the reward amounts for each preset time period.

11. A wallet system comprising:
    a wallet server including a first processor comprising hardware; and
    a first user terminal associated with a first user that includes a second processor comprising hardware, wherein
    the second processor is configured to:
      output, to the wallet server, first evaluation information from the first user terminal, the first evaluation information evaluating a second user, and
    a second user terminal associated with the second user that includes a third processor comprising hardware, wherein the third processor is configured to:

output, to the wallet server, second evaluation information from the second user terminal, the second evaluation information evaluating the first user, the first processor is configured to:
- calculate reward amounts for the first and second users based on the first evaluation information and the second evaluation information,
- deposit electronic money corresponding to the reward amounts to electronic wallets associated with the first and second user terminals,
- acquire, from the first and second user terminals, information about a shared deposit that has been deposited from balances of the electronic wallets of the first and second user terminals,
- transfer, from the shared deposit, electronic money corresponding to the reward amounts to the electronic wallets associated with the first and second user terminals, and
- calculate the reward amounts by allocating the shared deposit according to a ratio of the numbers of evaluations of each user included in the first and second evaluation information.

12. The wallet system according to claim 11, wherein the first processor is configured to calculate the reward amounts, within a range of the deposit, by multiplying the numbers of evaluations of each user included in the first and second evaluation information by a preset amount for one evaluation.

13. The wallet system according to claim 11, wherein the processor is configured to
- calculate the reward amounts by multiplying an absolute value of a difference between evaluations of the first and second user terminals included in the first and second evaluation information by a preset amount for one evaluation, and
- deposit electronic money corresponding to the reward amounts to the electronic wallets associated with the first and second user terminals by transferring electronic money corresponding to a reward amount to an electronic wallet associated with a user terminal having the larger number of evaluations among the first and second user terminals from the electronic wallet associated with a terminal having the smaller number of evaluations among the first and second user terminals.

14. The wallet system according to claim 13, wherein the first processor is configured to calculate the reward amounts within a preset amount range.

15. A reward providing method that causes a processor comprising hardware to:
- acquire first evaluation information from a first user terminal associated with a first user, the first evaluation information evaluating a second user,
- acquire second evaluation information from a second user terminal associated with the second user, the second evaluation information evaluating the first user,
- calculate reward amounts for the first and second users based on the first evaluation information and the second evaluation information,
- deposit electronic money corresponding to the reward amounts to electronic wallets associated with the first and second user terminals, and
- acquire, from the first and second user terminals, information about a shared deposit that has been deposited from balances of the electronic wallets of the first and second user terminals,
- transfer, from the shared deposit, electronic money corresponding to the reward amounts to the electronic wallets associated with the first and second user terminals, and
- calculate the reward amounts by allocating the shared deposit according to a ratio of the numbers of evaluations of each user included in the first and second evaluation information.

\* \* \* \* \*